United States Patent
Matityahu et al.

(10) Patent No.: US 8,320,399 B2
(45) Date of Patent: Nov. 27, 2012

(54) ADD-ON MODULE AND METHODS THEREOF

(75) Inventors: Eldad Matityahu, Palo Alto, CA (US); Robert Shaw, Los Gatos, CA (US); Dennis Carpio, San Jose, CA (US); Chung Liang, Santa Rosa, CA (US); Saiying Xie, Palo Alto, CA (US); Xin Li, Milpitas, CA (US); Siuman Hui, Millbrae, CA (US)

(73) Assignee: Net Optics, Inc., Santa Clara, CA (US)

( * ) Notice: Subject to any disclaimer, the term of this patent is extended or adjusted under 35 U.S.C. 154(b) by 342 days.

(21) Appl. No.: 12/714,404

(22) Filed: Feb. 26, 2010

(65) Prior Publication Data

US 2011/0211463 A1  Sep. 1, 2011

(51) Int. Cl.
*H04L 12/66* (2006.01)
*H04L 12/56* (2006.01)
*H04L 12/26* (2006.01)
*G06F 15/173* (2006.01)

(52) U.S. Cl. ........ 370/463; 370/229; 370/252; 370/389; 709/226

(58) Field of Classification Search .................. None
See application file for complete search history.

(56) References Cited

U.S. PATENT DOCUMENTS

| | | | |
|---|---|---|---|
| 4,802,161 A | 1/1989 | Byars et al. | |
| 5,173,794 A | 12/1992 | Cheung et al. | |
| 5,781,318 A | 7/1998 | Tremblay | |
| 5,825,775 A | 10/1998 | Chin et al. | |
| 6,041,037 A | 3/2000 | Nishio et al. | |
| 6,108,310 A | 8/2000 | Wilkinson et al. | |
| 6,167,025 A | 12/2000 | Hsing et al. | |
| 6,366,557 B1 | 4/2002 | Hunter | |
| 6,424,627 B1 | 7/2002 | Sorhaug et al. | |
| 6,449,247 B1 | 9/2002 | Manzardo et al. | |
| 6,836,540 B2 | 12/2004 | Falcone et al. | |
| 6,841,985 B1 | 1/2005 | Fetzer | |
| 6,898,630 B2 | 5/2005 | Ueno et al. | |
| 7,277,957 B2 | 10/2007 | Rowley et al. | |

(Continued)

FOREIGN PATENT DOCUMENTS

JP    2001-197066 A    7/2001

(Continued)

OTHER PUBLICATIONS

Gigamon Systems LLC, "GigaVUE—Product Brief", Gigamon Systems LLC, http://web.archive.org/web/20070815021951/www.gigamon.com/pdf/GigamonSystems-OnePageProductBrief.pdf, Aug. 15, 2007, 1 page.

(Continued)

*Primary Examiner* — Clemence Han
(74) *Attorney, Agent, or Firm* — IPSG, P.C. Intellectual Property Law

(57) ABSTRACT

An arrangement for processing data traffic flowing through a network is provided. The arrangement includes a data interface for receiving the data traffic. The arrangement also includes an inspection engine for analyzing the data traffic, wherein the analyzing is performed on at least payload data. The arrangement further includes means for routing the data traffic through the network, wherein the means for routing is configured to define one or more ports for transmitting the data traffic. The means for routing the data traffic is dynamic to balance the data traffic across multiple outgoing ports.

19 Claims, 4 Drawing Sheets

U.S. PATENT DOCUMENTS

| | | | |
|---|---|---|---|
| 7,415,013 | B1 | 8/2008 | Lo |
| 7,486,625 | B2 | 2/2009 | Matityahu et al. |
| 7,505,416 | B2 | 3/2009 | Gordy et al. |
| 7,788,365 | B1 | 8/2010 | Foster et al. |
| 2001/0040870 | A1 | 11/2001 | Ohmori et al. |
| 2002/0003592 | A1 | 1/2002 | Hett et al. |
| 2002/0026374 | A1 | 2/2002 | Moneymaker et al. |
| 2002/0176355 | A1 | 11/2002 | Mimms et al. |
| 2003/0112760 | A1* | 6/2003 | Puppa et al. ............... 370/241.1 |
| 2003/0145039 | A1 | 7/2003 | Bonney et al. |
| 2004/0109411 | A1 | 6/2004 | Martin |
| 2004/0120259 | A1 | 6/2004 | Jones et al. |
| 2004/0128380 | A1 | 7/2004 | Chen et al. |
| 2005/0108444 | A1 | 5/2005 | Flauaus et al. |
| 2005/0129033 | A1 | 6/2005 | Gordy et al. |
| 2005/0132051 | A1 | 6/2005 | Hill et al. |
| 2005/0257262 | A1 | 11/2005 | Matityahu et al. |
| 2005/0271065 | A1 | 12/2005 | Gallatin et al. |
| 2006/0083268 | A1 | 4/2006 | Holaday et al. |
| 2006/0083511 | A1 | 4/2006 | Edmunds et al. |
| 2006/0200711 | A1 | 9/2006 | Schondelmayer et al. |
| 2006/0233115 | A1 | 10/2006 | Matityahu et al. |
| 2006/0282529 | A1 | 12/2006 | Nordin |
| 2007/0002754 | A1 | 1/2007 | Matityahu et al. |
| 2007/0081549 | A1 | 4/2007 | Cicchetti et al. |
| 2007/0081553 | A1 | 4/2007 | Cicchetti et al. |
| 2007/0171966 | A1 | 7/2007 | Light et al. |
| 2008/0049627 | A1 | 2/2008 | Nordin |
| 2008/0214108 | A1 | 9/2008 | Beigne et al. |
| 2009/0040932 | A1 | 2/2009 | Matityahu et al. |
| 2009/0041051 | A1 | 2/2009 | Matityahu et al. |
| 2009/0168659 | A1 | 7/2009 | Matityahu et al. |
| 2009/0279541 | A1 | 11/2009 | Wong et al. |
| 2010/0146113 | A1 | 6/2010 | Matityahu et al. |

FOREIGN PATENT DOCUMENTS

| | | |
|---|---|---|
| JP | 2006148686 A | 6/2006 |
| KR | 10-2004-0058415 A | 7/2004 |

OTHER PUBLICATIONS

"VSS Easy Install Guide", VSS Monitoring Inc. 8 pages total. 2003-2005.

"PeriScope Central Management System (CMS) 5.0 Administrator's Guide", Peribit Networks, Inc. 13 pages total. 2003-2004.

"Sequence Reducer/ Sequence Mirror Operator's Guide", Peribit Networks, Inc. 13 pages total. 2001-2005.

"Fast Ethernet Fiber-to-Fiber Converters", Canary Communications, Inc. 7 pages total, 2004.

"Inter Partes Reexamination Office Action", U.S. Appl. No. 95/001,318, Patent in Re-examination: 7,486,625, Mailing Date: Apr. 23, 2010.

"Non Final Office Action", U.S. Appl. No. 11/174,032, Mailing Date: Apr. 23, 2008.

"Request for Inter Partes Reexamination of US Patent 7,486,625", Sonnenschein Nath & Rosenthal LLP, Dec. 18, 2009, 69 pages.

"Replacement Statement and Explanation under 37CFR 1,915 In Support of Request for Inter Partes Reexamination of US Patent 7,486,625", Sonnenschein Nath & Rosenthal LLP, Jan. 22, 2010, 251 pages.

Anonymous, "100Base-TX/100BBase-FX Media Converters E-100BTX-FX-04 User's Guide", Transitions Networks, Minneapolis, MN, Copyright 1998-2000, 4 pages.

"International Search Report", PCT Application No. PCT/US2011/026158, Mailing Date: Nov. 30, 2011.

"Written Opinion", PCT Application No. PCT/US2011/026158, Mailing Date: Nov. 30, 2011.

"Examination Report", EP Patent Application No. EP 08 17 1759, Mailing Date: Jun. 8, 2012.

"Non Final Office Action", U.S. Appl. No. 12/839,373, Mailing Date: Jun. 7, 2012.

European Search Report: Issued in EP Patent Application No. EP 08 17 1759, Mailing Date: Jul. 31, 2009.

International Preliminary Report on Patentabiiity: issued in PCT Application No. PCT/US2008/072493; Mailing Date: Feb. 18, 2010.

International Search Report; Issued in PCT Application No. PCT/US2008/072493; Mailing Date: Feb. 13, 2009.

Written Opinion; Issued in PCT Application No. PCT/US2008/072493;Mailing Date: Feb. 13, 2009.

Non Final Office Action Mail Date=Jun. 11, 2009.

U.S. Appl. No. 12/839;373, filed Jul. 19, 2010; Inventor=Eldad Matityahu.

Non Final Office Action Mail Date=Dec. 22, 2011.

U.S. Appl. No. 11/370,487, filed Mar. 7, 2006; Inventor=Eldad Matityahu; Patent No. 7,760,859; Issued Date=Jul. 20, 2010.

"Non Final Office Action" ; Mail Date=Mar. 25, 2009.

U.S. Appl. No. 12/705,195, filed Feb. 12, 2010; Inventor=Eldad Matityahu.

U.S. Appl. No. 13/042,135; filed Mar. 7, 2011; Inventor=Eldad Matityahu.

U.S. Appl. No. 13/230,760, filed Sep. 12, 2011; Inventor=Eldad Matityahu.

U.S. Appl. No. 11/965,668, filed Dec. 27, 2007; Inventor=Eldad Matityahu.

U.S. Appl. No, 11/835,233, filed Aug. 7, 2007: Inventor=Eldad Matityahu.

"Non Final Office Action"; Mail Date=Aug. 25, 2010.

Final Office Action; Mail Date=Oct. 30, 2009.

"Non Final Office Action"; Mail Date=Jun. 9, 2009.

"Gigavue—Product Brief"; Gigamon Systems LLC; www.gigamon.com: Mar. 28, 2012.

"Request for Inter Partes Reexamination of US Patent 7486625"; Sonnenschein Nath & Rosenthal LLP, Dec. 16, 2009, 69 pages.

Hp et al. "Reduced Gigabit Media Indpendent Interface (RGMII)"; Nov. 30, 2005: http://web.archive.org/web/20051113015000/http://www.hp.com/rnd/pdfs/RGMlly2_0_final_hp.pdf.

Wikipedia "Field-programmable gate array"; Jan. 21, 2005; http://web.archive.org/web/20050121193052/http://en.wikipedia.org/wiki/Field-programmable_gate_array.

Xilinx "LogiCare OPB Ethernet Lite Media Access Controller"; v1.01b, Mar. 3, 2006.

U.S. Appl. No. 11/174,032, filed Jul. 1, 2005; Inventor=Eldad Matityahu.

"Replacement Statement and Explanation under 37CFR 1.915 in Support or Request for Inter Partes Reexamination of US PAtent 7486625"; Sonnenschein Nath & Rosenthal LLP, Jan. 22, 2010; 251 pages.

Non Final Office Action; Mail Date=Apr. 23, 2008.

* cited by examiner

ADD-ON MODULE AND METHODS THEREOF

CROSS REFERENCE TO RELATED APPLICATIONS

The present invention is related to the following applications, all of which are incorporated herein by reference:

Commonly assigned application entitled "Director Device and Methods Thereof," filed on Dec. 27, 2007, by Matityahu et al. (application Ser. No. 11/965,668).

BACKGROUND OF THE INVENTION

In a network environment, one or more network devices may be employed to direct the flow of data packets flowing between the devices located on the network. To prevent any one network device from being overloaded, load balancing may be performed. As discussed herein, load balancing refers to a technique for maximizing resource utilization and minimizing response time by distributing workloads.

To facilitate discussion, FIG. 1 shows a simple block diagram of a network device with a ten gigabit backbone structure. Network device 102 may be a router, a switch, a tap device, and the like. Network device 102 may include a plurality of network ports (104, 106, 108, 110, 112, 114, 116, 118, and 120). Port 104 may be configured to handle up to ten gigabits of data while ports 106-120 may only be configured to handle up to one gigabit of data.

Consider the situation wherein, for example, a data stream consisting of data packets ABCDEFGHIJ is being received by network device 102 at port 104. Once received by network device 102, the data packets ABCDEFGHIJ may be distributed among different ports. Since each port is only capable of supporting up to one gigabit of data traffic at any one time, the data packet has to be no larger than one gigabit.

In order to provide for maximum resource utilization and to minimize response time, load balancing may be performed. In some network devices, the criteria for load balancing may be set by the user. In an example, the user may provide detailed instructions on how the data traffic may be distributed among the various network ports. Unfortunately, this method of load balancing tends to be tedious and requires the user to have a fairly extensive understanding of the data traffic through the network.

Also, the user may not be able to define the traffic flow such that all data packets from the same conversation are routed through the same port. As a result, data packets may not arrived at the destination in order. Thus, additional resources may be required to reorder the data packets.

Further, if the data stream being routed through a particular port is larger than what the port can handle, some of the data packets may be dropped, especially if the port does not have a buffer in place to handle the overload. Even if a buffer is in place, some buffers may not be sufficient to handle the entire overload and some data packets may be dropped.

Load balancing may also be performed automatically. Network devices, such as devices that support the IEEE 802.3ad link aggregation standard, may provide for automatic load balancing through a hashing algorithm. The hashing algorithm is an algorithm that may allow the system to automatically distribute data traffic based on a predefined set of rules (see example of rules in Table 1 below).

TABLE 1

Modes of Hashing

| Mode | Hashing Rules |
|---|---|
| 1 | Source address, Virtual Local Area Network (VLAN) identification number (ID), EtherType, Source module, and port ID |
| 2 | Destination address, Virtual Local Area Network (VLAN) identification number (ID), EtherType, Source module, and port ID |
| 3 | SA-XOR-DA (formula for using source and destination addresses), Virtual Local Area Network (VLAN) identification number (ID), EtherType, Source module, and port ID |
| 4 | SIP (source internet protocol address) and source TCP/UDP (transmission control protocol/user datagram protocol)port |
| 5 | DIP (destination internet protocol address) and destination TCP/UDP port |
| 6 | SIP-XOR-DIP (formula using source and destination addresses), Source and Destination TCP/UDP port |

In an example, data packets that meet the criteria as defined by the first mode may be routed through port 110, for example. By utilizing a hash-based load balancing method, data packets related to the same conversation are usually kept together and sent through the same port. Thus, the data packets are usually received at the destination without having to be reordered.

Although the hash-based load balancing method allows the user to set up a predefined set of rules for the hashing algorithm to perform its calculation, the hash-based load balancing method usually does not provide a method for the user to define the flow of data traffic. In other words, the user is not able to define what type of data stream is flowing through which port.

In addition, a hash-based load balancing method usually does not provide for an even distribution of data packets across the available ports. One reason for the potential uneven distribution is that the user is not able to assign a percentage weight to each port. Instead, the system automatically determines the port based on the rule that is met. Accordingly, an overload may occur on one or more ports. For example, a conversation flow that is being routed through port 110 may be fairly large resulting in port 110 being overloaded. Thus, even though other ports may be available to assist in data traffic routing, the hash-based load balancing method does not provide a deterministic method for rebalancing of data traffic to other ports. As a result, data packets may be accidentally dropped.

Accordingly, an arrangement and/or method for performing load balancing without loss of data packets is desirable.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
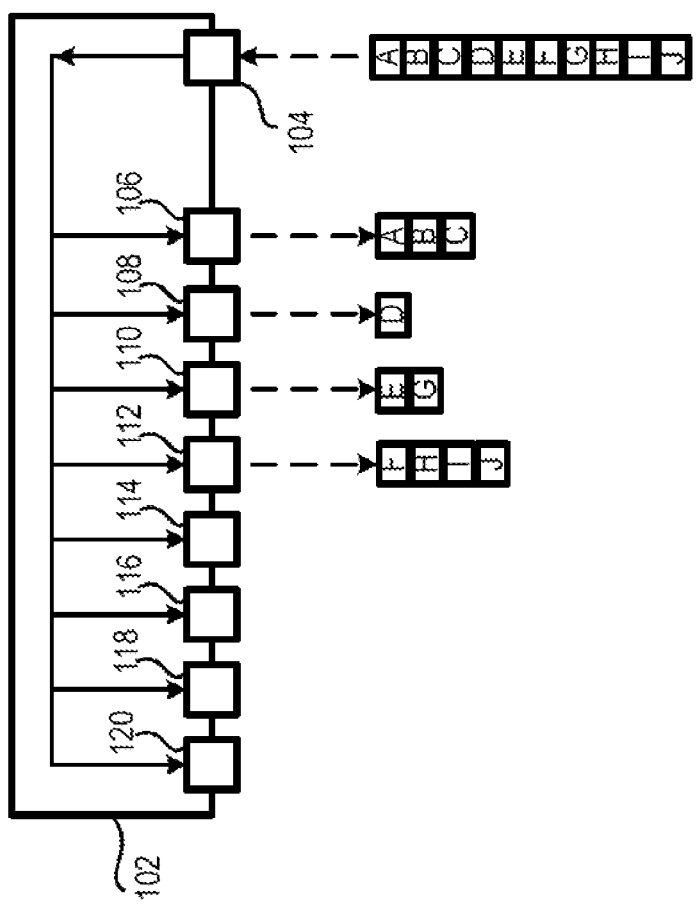
FIG. 1 shows a simple block diagram of a network device with a ten gigabit backbone structure.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In accordance with embodiments of the present invention, an add-on module is provided for managing data traffic through the network. Embodiments of the invention include a load-balancing engine for performing load balancing on data packets flowing through the network. Embodiments of the invention further include an inspection engine for analyzing the individual data packets. Embodiments of the invention also include a user configurable module for setting the parameters for performing load-balancing and/or analyzing the data packets.

In an embodiment of the invention, an add-on module is a modular system that is configured to be compatible with network devices (such as routers, taps, switches, and the like). The add-on module may be configured to couple to a network device via a data interface, in an embodiment. Since the add-on module is a modular system, the add-on module may be quickly and easily replaced with substantially no downtime required by the network device to troubleshoot the add-on module.

In an embodiment, the add-on module may be configured to perform load-balancing on the data traffic flowing through the network device that the add-on module is coupled to. In one embodiment of the invention, the add-on module may include a load-balancing engine for performing the load balancing. Load-balancing may be performed by distributing the data packets among the available data ports based on a set of parameters. The set of parameters may provide guidelines for routing the data packets.

In an embodiment, the set of parameters may be based on an algorithm that may provide an even distribution of the data packets. In another embodiment, the set of parameters may be user-configurable. In an example, a user may employ a user-configurable module to set up a percentage distribution. In another example, the user may set up a percentage distribution based on filtering criteria. As can be appreciated from the foregoing, the load-balancing engine can be a dynamic and flexible engine that is capable of reconfiguring itself to distribute the data traffic across multiple data ports in order to prevent the network device from being overloaded.

In another embodiment of the invention, the add-on module may be configured to perform filtering on the data traffic flowing through the network device. The filtering may be performed by an inspection engine (such as a data packet inspection engine). Unlike the prior art, the filtering performed by the inspection engine is not limited to the data stored in the header. Instead, the inspection engine is configured, in one embodiment, to analyze and filter the data packets based on the header data and the payload data.

In this document, various implementations may be discussed using network tap as an example. This invention, however, is not limited to network tap and may include any network and/or security appliances (e.g., routers, switches, hubs, bridges, load balancers, firewalls, packet shapers, and the like). Instead, the discussions are meant as examples and the invention is not limited by the examples presented.

The features and advantages of the present invention may be better understood with reference to the figures and discussions that follow.

Figure 2:
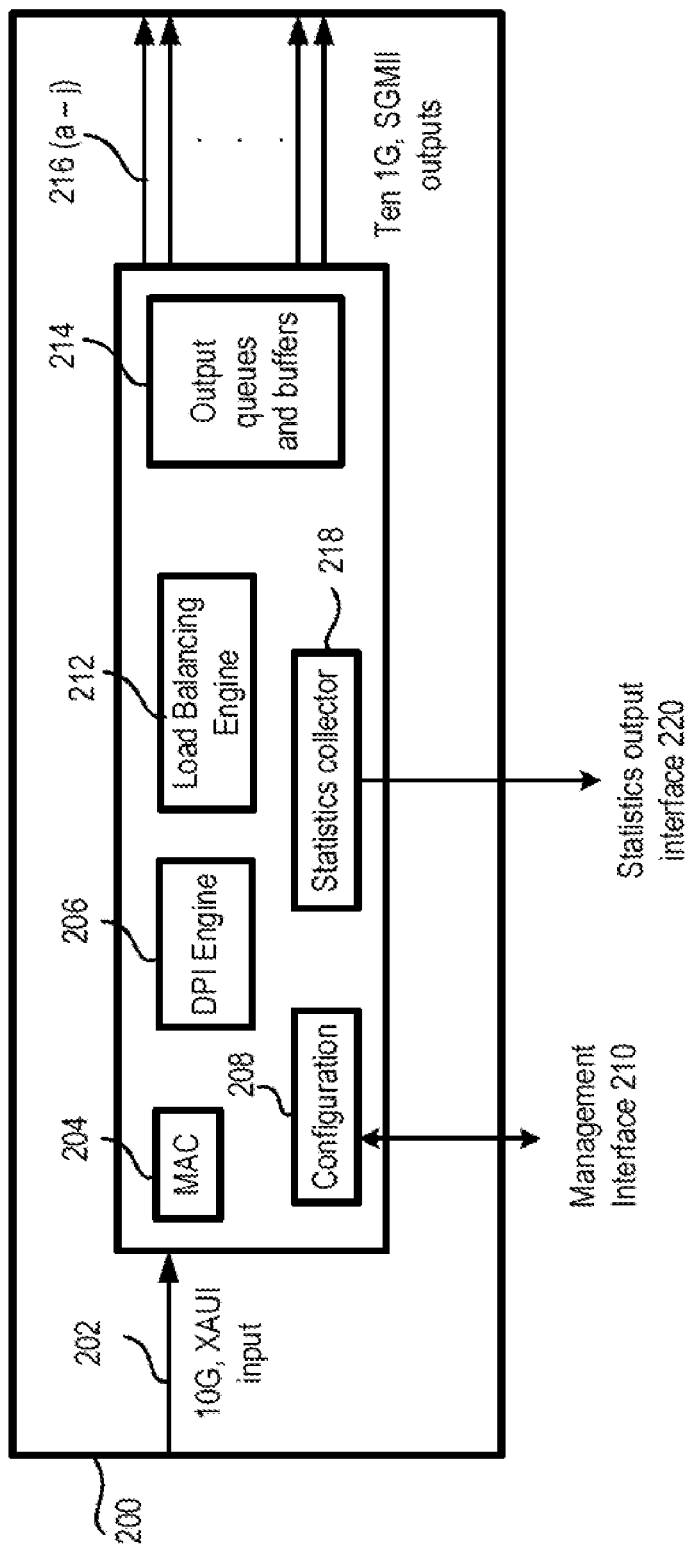
FIG. 2 shows, in an embodiment of the invention, a simple functional block diagram of an add-on module.

FIG. 2 shows, in an embodiment of the invention, a simple functional block diagram of an add-on module 200. Consider the situation wherein, for example, data packets are being received by add-on module 200. In one embodiment, the data flowing in may be received through a ten gigabit input line, such as a XAUI (Ten Gigabit Attachment Unit Interface) line 202. Although other interfaces may be employed, the current standard is the XAUI interface.

Once the data (usually in an analog format) travels through a physical layer such as a XAUI to be received by add-on module 200, a MAC 204 (Media Access Control) component may be employed to convert the data from a lower physical analog signal to a signal (such as a digital signal) that may be handled by components at a higher open system interconnected (OSI) levels. Those skilled in the art are aware of the requirements of a MAC component and no further discussion will be provided.

Once the data has been converted into a signal that can be handled by a component of a higher OSI level, the data stream may be sent onward to a DPI (deep-packet inspection) engine 206. In an embodiment, DPI engine 206 may be configured to perform filtering. The filtering criteria may be predefined. Examples of filtering criteria may include filtering based on IP address, keywords, destination address, and the like. In an example, the filtering DPI engine 206 may be configured to drop all data packets except for those related to http traffic. In an embodiment, a configuration component 208 may be employed to establish the filtering criteria that may be employed by DPI engine 206 to perform data filtering on the incoming data packets. Configuration component 208 may be coupled to a user device (such as a computer) via a management interface 210. By employing the user device, a user can set up the filtering criteria.

In the prior art, filtering on incoming data packet is usually performed on header data. Unlike the prior art, DPI engine 206 may be configured to perform filtering not only on the header data but also on the payload data, in an embodiment. Given that more data are stored on the payload, the ability for DPI engine 206 to filter on the payload data enables DPI engine 206 to have more versatility and more granularity in sorting the data packets that are being received.

Since add-on module 200 is analyzing the payload data, more information about the data packets may be collected. In an embodiment, the analyzed data may be made available for further analysis. In an example, a virus may have infected the network. The data collected during the payload analysis may be employed to help troubleshoot the problem.

In an embodiment, a user may also define the port(s) for handling the filtered data. In an example, all data traffic related to auditing may be routed through port 216d and port 216e. As a result, data packets from the same session may be routed through the same port, thereby minimizing the possibility of having to recreate the data stream.

Additionally, or alternatively, the data packets may be forwarded to a load balancing engine 212. In an embodiment, load balancing engine 212 may be configured to perform load balancing by distributing the data packets among the available data ports. Load balancing may be performed by the system based on a set of parameters. The parameters may be provided by the user through configuration component 208. In an example, the user may set up percentage distribution by providing guidelines for routing data traffic. For example, the user may require that 20 percent of the data traffic be routed through port 216a, 30 percent of the data traffic through port 216b, and the remaining data traffic through port 216c.

Additionally or alternatively, the user may set up percentage distribution based on filtering criteria. In an example, the user may require that 40 percent of the data traffic that meets the auditing filtering criteria is to be routed through port 216d and the remaining 60 percent is to be routed through port 216e. In some situation, data traffic handled by one or more ports may be rerouted by load balancing engine 212 to another port if the data traffic at port 216a, for example, is above a predefined threshold. In other words, load balancing engine 212 may be a dynamic and flexible engine capable of reconfiguring itself in order to balance the incoming data traffic across multiple data ports.

In an embodiment of the invention, an output queue and buffer component 214 may be provided for handling the outgoing data traffic. Data packets are routed through output queue and buffer component 214 to one of the ten one gigabit ports (216a, 216b, 216c, 216d, 216e, 2161, 216g, 216h, 216i, and 216j). Unlike the prior art, ten data ports may be provided instead of the standard eight data ports in order to minimize the possibility of data packets being dropped.

In an embodiment, add-on module 200 may include a statistic collector component 218, which may be configured to gather data about details about the data traffic flowing through add-on module 200. In an embodiment, the statistical data collected may be routed to an external data analysis module via a statistic output interface 220 for analysis.

In an embodiment, add-on module 200 may be a modular device. In other words, if the add-on module is not working properly, troubleshooting can be as simple as removing the current add-on module and replacing the module with another one. Given that the task of replacing the add-on module is a fairly quick process, the downtime required to troubleshoot an add-on module is fairly minimal.

Figure 3:
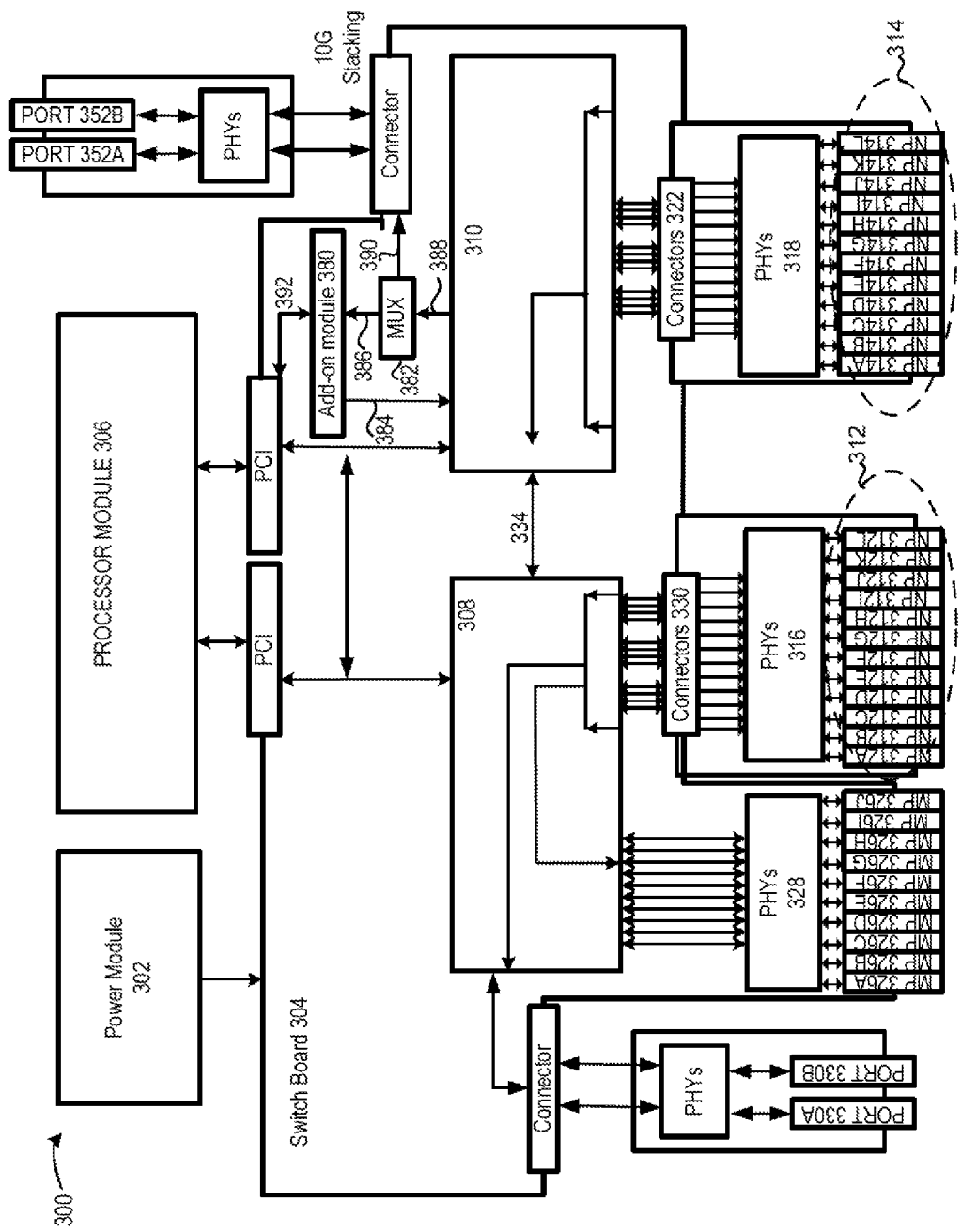
FIG. 3 shows, in an embodiment of the invention, an overall schematic diagram of an add-on module coupled to a network device, such as a director device.

FIG. 3 shows, in an embodiment of the invention, an overall schematic diagram of an add-on module coupled to a network device, such as a director device 300. Director device 300 is an example of a 10 gigabits to a 1 gigabit monitoring device that is configured at least for consolidating a plurality of network functionality (e.g., filtering, aggregation, etc.). The Director device was previously disclosed in application Ser. No. 11/965,668, filed Dec. 27, 2007 by Matityahu et al.

Director device 300 may include a power module 302, which may be configured at least for providing power to director device 300. Power module 302 may be configured to couple with a switchboard arrangement 304 via a set of connectors. In an embodiment, switchboard arrangement 304 may include a DC (direct current) module for receiving and converting the power received by power module 302.

Also, director device 300 may include a processor module 306, which may be configured at least for providing the processing capability to director device 300. Processor module 306 may be coupled to switchboard arrangement 304 via a set of bus (e.g., peripheral component interconnect bus), thereby enabling processor module 306 to communicate with switchboard arrangement 304.

Switchboard arrangement 304 may include a set of switch chips. In an embodiment, the set of switch chips may include two switch chips 308 and 310. Each switch chip may be capable of directing data traffic through director device 300. Director device 300 may also include network port arrangements (312 and 314) for receiving and transmitting data traffic. Switch chip 308 may be configured to handle data traffic flowing from network ports 312A-312L) through a set of physical layer interfaces (PHYs) 316 and a set of connectors 330. Similarly, switch chip 310 may be configured to handle data traffic flowing from network ports (314A-314L) through a set of PHYs 318 and a set of connectors 322.

As can be appreciated from the foregoing, the number of network ports that may be coupled to a switch chip may depend upon the capability of the chip. In an example, if a switch chip is capable of handling 12 gigabits of data, then the switch chip may be capable of handling up to 12 network ports, if each network port is capable of supporting 1 gigabit of data. However, if the network port is designed to handle up to 10 gigabits of data, then the switch chip may only be able to handle 1 network port. Accordingly, the configuration of the network port may depend upon a manufacturer's preference.

Data traffic may traverse through one network port and out another network port. In an example, data may flow into network port 312A, through one of set of PHY 316 and one of set of connectors 330 to be received by a switch chip 308. Switch chip 308 may route data traffic back out through one of set of connectors 330 and one of set of PHYs 316 and out through network port 312L. For in-line traffic, each pair of network ports is defined as network pair, for example 312A and 312B. If power module 302 is present, traffic from port 312A may be re-directed to any port from 312A to 312L. However, without power module 302, traffic is usually connected according to network pairing (312A and 312B).

In an embodiment, switch chip 308 and 310 may be coupled together via a set of connectors 334 or direct (printed circuit board) PCB traces, thereby enabling data traffic to flow between the two switches. In an embodiment, set of connectors 334 may be capable of handling high traffic capacity, thereby enabling a large amount of data to be transmitted through set of connectors 334. In an example, if each of the network ports is capable of receiving up to 1 gigabit of data, then at any one time, up to 12 gigabits of data may be flowing to a switch chip. Thus, connector 334 may have to be a large enough pipeline to enable data to be transmitted between the two switch chips with minimal delay.

In an embodiment of the invention, director device 300 may also be configured for monitoring data traffic flowing through the network. In an embodiment, director device 300 may include a set of monitor ports (326A-326J) and a set of PHYs 328. In an example, data traffic flowing through the network ports may be copied and directed by one of the switch chips (308, 310) toward one or more of the monitors. Although both switch chips may be capable of directing traffic toward the monitors, switch chip 308 may be configured to be the primary chip. As the primary chip, switch chip 308 may be configured to include a logic arrangement for performing most of the monitoring functions In yet another embodiment, director device 300 may include a set of ports (330A and 330B). Set of port 330A and 330B may be configured for receiving and sending data packets that may be up to 10 gigabit. By having a set of ports capable of supporting 10 gigabit, director device 300 may be capable of interacting with network devices that may be on a different network backbone and/or have different capability. In an example, director device 300 may be on a 1 gigabit network. However, director device 300 may be coupled to a monitoring device that is capable of accepting up to 10 gigabit of data. To enable the 10 gigabit device to receive the data traffic, the 10 gigabit device may be coupled to director device 300 via a 10 gigabit set of ports (330A and 330B).

In yet another embodiment, director device 300 may include a set of ports 352A and 352B. In an embodiment, set of ports 352A/352B may be a second set of ports capable of supporting up to 10 gigabit of data. Thus, by including set of ports 352A/352B, director device 300 may be configured for receiving and sending data packets to other director devices, thereby enabling stacking (e.g., daisy chain) to occur. By way of example, multiple devices may be stacked (e.g., cascaded) via the use of set of ports 352A/352B.

By forming a daisy chain, the first director device may have access to software and hardware that may be made available through another director device. In an example, director device 300 may be connected to a director device B, which is connected to director device C and director device D. Assume that director device D is connected to 5 monitoring devices. Thus, instead of having to purchase additional monitoring devices, director device 300 may share the monitoring devices that are connected to director device D. As a result, the expense associated with buying additional monitoring devices, the expense of housing the additional monitoring devices, the expenses of maintaining the additional monitoring devices, and the like may be minimized.

In an embodiment, load balancing may be performed on data traffic flowing through director device. In an example data traffic flowing through network ports 314A-314L may flow up through PHY 318 through connectors 322 to switch 310. Switch 310 may then send the data traffic to a MUX/DEMUX component 382 via a path 388. MUX/DEMUX component 382 is capable of handling up to 10 gigabit traffic. From MUX/DEMUX component 382, the data traffic may flow onward to another network device along a path 390 through either ports 352A or 352B. In an embodiment, MUX/DEMUX component 382 may forward the data traffic to an add-on module 380 via a path 386.

Within add-on module 380, the data traffic may be filtered by a DPI engine and/or load balancing may be performed by a load-balancing engine, as previously discussed in FIG. 2. Once the data packets have been filtered/distributed, the data traffic may then be sent along a path 384 (wherein path 384 represents one of ten one gigabit port) back to switch 310 before being sent onward to switch 308 for further processing.

Similarly, data traffic flowing through ports 312A-312L may flow through switch 308 along path 334 to switch 310, before being outputted through one of ports 314A-314L. In this situation, upon receiving the data traffic from switch 308, switch 310 may send the data traffic to add-on module 380 for processing (e.g., DPI function and/or load balancing). Once the data traffic has been processed, the data traffic may then be sent along a path 384 back to switch 310 before being sent onward through one of the data ports.

In an embodiment, add-on module 380 is coupled to process module 306 via a path 392. The relationship with process module 306 enables add-on module 380 to receive user-configurable parameters that may be employed by add-on module 380 to perform filtering and/or load-balancing. The relationship with process module 306 may also enables statistic data collected by add-on module 308 to be sent to process module 306 for analysis.

As can be appreciated from the foregoing, director device 300 may be comprised of a plurality of different components. Each of the components may be modularized in order to enable each component to be serviced and/or repaired (such as fix and/or replaced) if the component is not functioning properly. In an example, if power module 302 is malfunctioning, power module 302 may be easily removed and replaced with another power module. In another example, if add-on module 380 has to be replaced, the add-on module may be easily replaced with little impact on the overall network device.

As can be appreciated from the foregoing, any hardware and/or software that may be available to director device 300 may also be made available to other director devices that may be connected in a daisy chain to director device 300. In other words, if add-on module 380 is connected to director device 300, the other director devices connected in a daisy chain to director device 300 may also have access to add-on-module 380 to perform the filtering and/or load balancing. Through the daisy chain feature, expenses (e.g., cost of additional units, cost of housing the additional units, cost of maintaining the additional units, etc.) may be minimized since hardware/software sharing may occur between the director devices.

Figure 4:
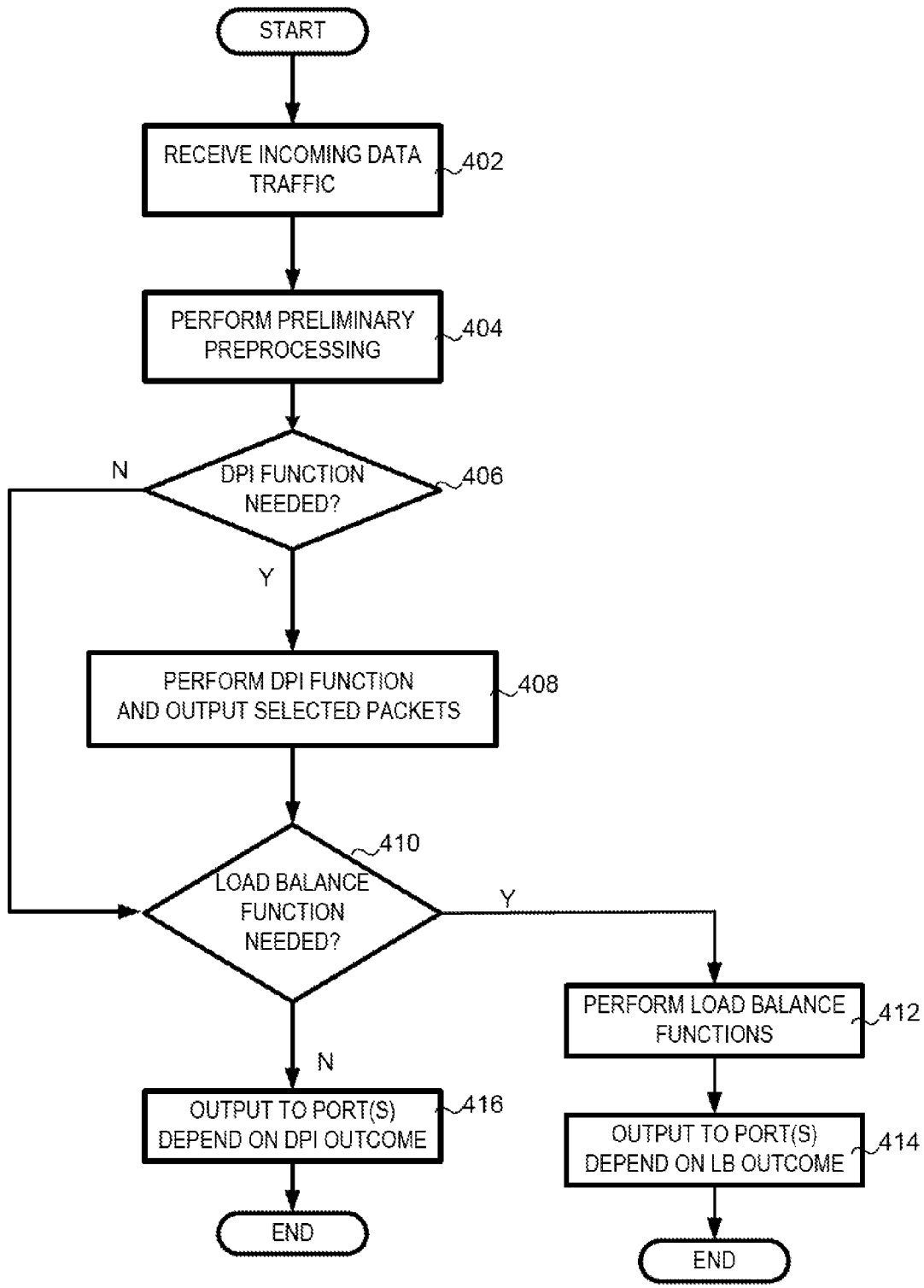
FIG. 4 shows, in an embodiment of the invention, a simple flow chart illustrating the steps for performing load balancing.

FIG. 4 shows, in an embodiment of the invention, a simple flow chart illustrating the steps for performing load balancing. FIG. 4 will be discussed in relation to FIGS. 2 and 3.

At a first step 402, incoming data traffic is received. Consider the situation wherein data traffic is flowing into director device 300. Data traffic may be flowing from multiple sources. In an example, data traffic may be coming from one of the network ports. In another example, data traffic may be flowing through another director device. As aforementioned, stacking (or daisy chain) may occur in which director device 300 may be connected to at least another director device through one of the 10 gigabits interfaces.

The data traffic may be received by one of the switches (switch 308 or switch 310). Before the switch sends the data traffic onward to add-on module 380 for processing, the switch may perform preliminary preprocessing (step 404). Preliminary processing may include but are not limited to pre-filtering, data optimization, and the like. In an example, pre-filtering may include applying a set of criteria to the data stored in the header. In an example, pre-filtering may be performed to identify data packets that may have failed the set of criteria. By performing pre-filtering, less filtering may be required to be performed by the add-on module.

Preliminary preprocessing may also include performing data optimization. Since data traffic may be flowing in from multiple sources, the switch may aggregate the incoming data packets from multiple sources before sending the data traffic through a single interface to add-on module 380.

Once the data traffic has been received by add-on module 380, at a next step 406, a check is performed to determine if the data packets have to be filtered. In an embodiment, a DPI engine (such as DPI engine 206) is employed to perform filtering. The filtering criteria may be user configurable and may have been predefined.

If filtering criteria have been established, then DPI engine 206 performs its task at a next step 408. In an embodiment, only the data packets that meet the filtering criteria is saved and routed onward to load-balancing engine 212.

However, if no filtering criteria have been established, then the data packet may be sent to load-balancing engine 212.

At a next step 410, a check is performed to determine if load-balancing is required. The parameters for performing load-balancing may be established by the user. If no parameter has been provided, then load-balancing may not be needed and the data packets may be outputted through one of the one gigabit port (step 416).

However, if parameters have been established for load-balancing, at a next step 412, load balancing may be performed by load-balancing engine 212 based on the parameters established. Once the data packets have been distributed based on the parameters, the outputted data packets are then forwarded through one of the one gigabit port (step 414).

As can be appreciated from the foregoing, an add-on module is provided for managing load balancing and payload filtering. As can be seen from FIG. 3 and FIG. 4, the filtering and the load-balancing functions are two independent functions. In other words, one function can happen without the other one occurring. Further, both functions can occur. If both functions occur, the preferred method is to perform the filtering function before performing load-balancing although load-balancing may occur before performing filtering without sacrificing functionality.

In another aspect of the invention, the inventors realized a plurality of statistical data may be collected by the network device and/or the add-on module. Traditionally, statistical data collected is not readily available. In an example, to retrieve the statistical data, IT personnel may have to log onto the system in order to access the data.

The inventors herein realized that if the data is visually displayed in an onboard physical display, the IT personnel may quickly access the health of each component of the network, including the add-on module, without being required to log onto the system to retrieve the information. In accordance with embodiments of the invention, a network device and/or security appliance, such as a director device, with a visual performance display arrangement is provided.

In this document, various implementations may be discussed using utilization rate as an example. This invention, however, is not limited to utilization rate and may include any statistical data. Instead, the discussions are meant as examples and the invention is not limited by the examples presented.

In this document, various implementations of the display for statistical data may be discussed using director device as an example. The invention is not limited to a director device and may be implemented with any network and/or security appliance (e.g., routers, switches, hubs, bridges, load balancer, firewalls, packet shaper, and the like) that is able to support the add-on module. Instead, the discussions are meant as examples and the invention is not limited by the examples presented.

In an embodiment of the invention, a network device and/or security appliance, such as a director device, with a visual performance display arrangement may be provided for displaying vital statistical data. Examples of statistical data may include, but are not limited to, real-time utilization rate of network capacity, average utilization rate, highest peak of traffic peaks, traffic types, fault conditions, and the like. In an embodiment of the invention, the visual display arrangement may display the statistical data for each of the ports, regardless if the port is a network port or a monitoring port. In other words, the visual display arrangement may display statistical data even if the monitoring function (i.e., tap functions) is dormant. The statistical data may be displayed in text and/or graphically. As can be appreciated from the foregoing, the statistical data may be visually available without requiring IT personnel to log in to retrieve the data, thereby increasing the efficiency of the IT personnel and decreasing response time for handling network anomalies.

As can be appreciated from the foregoing, a plurality of statistical data may be available. In an embodiment of the invention, a logic arrangement (e.g., such as an FPGA (field-programmable gate array), an application-specific integrated circuit (ASIC), complex programmable logic device (CPLD), and the like) may be employed to analyze the statistical data and to generate the statistical data. As can be appreciated from the foregoing, the logic arrangement that may be employed to perform the analysis and to calculate the statistical data may vary depending upon the manufacturing preference. In an example, the logic arrangement may include a single programmable component (such as a FPGA). In another example, the logic arrangement may be a set of programmable, components (such as a set of FPGAs), with each programmable component being configured to perform different function. In yet another example, the logic arrangement may include a set of programmable components (such as a set of FPGAs) and a set of programmable digital electronic component (such as a set of microprocessors).

In an embodiment of the invention, the network device and/or security appliance, such as a director device, may include a visual performance display arrangement. In an embodiment, the visual display arrangement may be an LCD (liquid crystal display) screen. As can be appreciated from the foregoing, the size of the visual display arrangement may be dependent upon a manufacturer's configuration preference. In an example, the size of the LCD screen may depend upon the size of the director device.

As can be appreciated from the foregoing, the statistical data that may be displayed on visual display arrangement may be data that may aid IT personnel in performing their task of maintaining and/or monitoring a company's network. Although utilization rates have been utilized as examples for implementing a network device and/or security appliance, such as a director device, with a visual performance display arrangement, other statistical data may also be shown. Examples of type of technical and diagnostic data that is displayed may include, but are not limited to, real-time utilization level for each path of a network link, size and time of the greatest traffic peaks, SNMP traps for system/link/power, average percent utilization of network capacity, counters for total packets, total bytes, and the like.

In an embodiment, network data may be updated periodically to visually display the real-time data. In another embodiment, the statistical data that may be displayed may be cycled. In other words, the amount of statistical data that may be viewed may be limited to the visual display arrangement. To enable the different statistical data to be viewed, different methods may be employed to determine when the network data may be cycled. In an example, statistical data may be displayed for a pre-set time period. In another example, a control component, such as a button or a rolling wheel, may be utilized to enable the IT personnel to select the desired data parameters. As can be appreciated from the foregoing, the mode in which the statistical data may be displayed may vary. In an example, the statistical data may be shown as text. In another example, the statistical data may be shown graphically (e.g., charts, bar graphs, etc.).

As can be appreciated from the foregoing, one or more embodiments of the present invention provide for methods and apparatuses for displaying statistical data on a network device and/or security appliance. By visually displaying the statistical data, instantaneous statistical data may be readily available to the IT personnel at the network device and/or security appliance. Thus, efficiency may increase and cost may decrease by making the statistical data visually accessible. Furthermore, it is contemplated that custom configuration may be exported to an external media storage device through an interface (e.g., USB or network interface).

While this invention has been described in terms of several preferred embodiments, there are alterations, permutations, and equivalents, which fall within the scope of this invention. Although various examples are provided herein, it is intended that these examples be illustrative and not limiting with respect to the invention.

Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims. If the term "set" is employed herein, such term is intended to have its commonly understood mathematical meaning to cover zero, one, or more than one member. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. An arrangement for processing data traffic flowing through a network, comprising:
    a data interface for receiving said data traffic;
    an inspection engine for analyzing said data traffic, wherein said analyzing is performed on at least payload data; and
    means for routing said data traffic through said network, wherein said means for routing is configured to define one or more ports for transmitting said data traffic, said means for routing said data traffic being dynamic to balance said data traffic across said one or more ports for transmitting.

2. The arrangement of claim 1 further including a media access control component for converting said data traffic from an analog signal to a digital signal.

3. The arrangement of claim 1 wherein said inspection engine is a deep-packet inspection engine.

4. The arrangement of claim 3 wherein said inspection engine is configured for filtering said data traffic based on a set of filtering criteria.

5. The arrangement of claim 4 wherein said set of filtering criteria is user-configurable.

6. The arrangement of claim 5 wherein said means for routing said data traffic include a load balancing engine.

7. The arrangement of claim 6 wherein said load balancing engine is configured for distributing said data traffic based on a set of parameters.

8. The arrangement of claim 7 wherein said set of parameters include percentage distribution for routing said data traffic through said multiple outgoing ports.

9. The arrangement of claim 8 further including a configuration module, wherein said configuration module is configured to provide an interface for receiving at least one of said set of parameters and said set of filtering criteria.

10. The arrangement of claim 1 further includes a statistic collector, wherein said statistic collector is configured to gather details about said data traffic.

11. A method for managing data traffic flowing through a network, comprising:
    receiving a plurality of data packets;
    analyzing payload data of said plurality of data packets based on a set of criteria; and
    routing said plurality of data packets through said network, said routing includes defining one or more ports for transmitting said data traffic, wherein said routing is dynamically performed to balance said data traffic across said one or more ports for transmitting.

12. The method of claim 11 further including converting said plurality of data packets from an analog signal to a digital signal.

13. The method of claim 11 further including dropping a set of data packets of said plurality of data packets if said set of data packets fails to pass said set of criteria.

14. The method of claim 11 wherein said routing of said plurality of data packets is based on percentage distribution.

15. The method of claim 11 further including collecting statistical data about said data traffic, wherein said statistical data is available for further analysis.

16. The method of claim 11 wherein said set of criteria is user-configurable.

17. A network device arrangement for managing data traffic through a network, comprising:
    a power module for providing power to at least circuitry of said network device arrangement;
    a processor module for providing processing capability to said network device arrangement;
    a set of network ports, said set of network ports including a set of input network ports for receiving said data traffic and a set of output network ports for outputting said data traffic from said network device arrangement;
    a set of switch modules, said set of switch modules being configured to include at least a first switch module and a second switch module, said first switch module and said second switch module interacting with one another to perform a plurality of monitoring functions on said data traffic received by said set of switch modules;
    an add-on module for performing at least one of load balancing and filtering on said data traffic; and
    at least one monitoring port configured for receiving at least one of said data traffic traversing through said network, whereas said data traffic is configured to traverse said network device arrangement between said set of input network ports and said set of output network ports wherein said add-on module include at least an inspection engine for analyzing said data traffic, wherein said analyzing is performed on at least payload data, and means for routing said data traffic through said network, wherein said means for routing is configured to define one or more ports for transmitting said data traffic, said means for routing said data traffic being dynamic to balance said data traffic across said one or more ports for transmitting.

18. The network device arrangement of claim 17 wherein said add-on module further including
    a media access control component for converting said data traffic from an analog signal to a digital signal,
    a configuration module, said configuration module being configured to provide an interface for receiving at least one of a set of parameters and a set of filtering criteria, and a statistic collector, said statistic collector being configured to gather details about said data traffic traversing through said network device arrangement.

19. The network device arrangement of claim 17 wherein said means for routing said data traffic include a load balancing engine, wherein said load balancing engine is configured for distributing said data traffic based on a set of parameters.

* * * * *